(12) United States Patent
Branson

(10) Patent No.: US 6,691,488 B2
(45) Date of Patent: *Feb. 17, 2004

(54) METHOD AND APPARATUS FOR STRUCTURAL CONVERSION OF POULTRY HOUSES

(76) Inventor: John Branson, 1949 Sam Bell Rd., Clarkesville, GA (US) 30523

(*) Notice: Subject to any disclaimer, the term of this patent is extended or adjusted under 35 U.S.C. 154(b) by 0 days.

This patent is subject to a terminal disclaimer.

(21) Appl. No.: 09/829,720

(22) Filed: Apr. 10, 2001

(65) Prior Publication Data

US 2001/0015047 A1 Aug. 23, 2001

Related U.S. Application Data

(63) Continuation-in-part of application No. 09/236,157, filed on Jan. 22, 1999, now Pat. No. 6,212,850.
(60) Provisional application No. 60/072,229, filed on Jan. 23, 1998.

(51) Int. Cl.[7] .............................. A01K 31/08; E04B 7/08
(52) U.S. Cl. .................... 52/745.01; 52/93.1; 52/641; 52/643; 52/645; 52/653.1; 52/690; 119/437
(58) Field of Search .................. 52/745.01, 745.18, 52/745.2, 745.13, 745.14, 690, 653.1, 646, 645, 643, 641, 637, 90.2, 93.1, 71, 69; 119/436, 437

(56) References Cited

U.S. PATENT DOCUMENTS

| | | | |
|---|---|---|---|
| 822,295 A | 6/1906 | Muller | |
| 1,981,418 A | 11/1934 | Kreutzer | |
| 2,263,214 A | 11/1941 | Larkin et al. | |
| 2,480,330 A | 8/1949 | Kump | |
| 2,482,918 A | * 9/1949 | Kump, Jr. ............... | 52/265 |
| 2,871,997 A | 2/1959 | Simpson et al. | |
| 2,989,154 A | 6/1961 | Colby, Jr. | |
| 3,070,845 A | * 1/1963 | Cheskin ................... | 29/446 |
| 3,162,278 A | * 12/1964 | Rasch ..................... | 52/656.2 |

(List continued on next page.)

FOREIGN PATENT DOCUMENTS

| | | | | |
|---|---|---|---|---|
| AU | 213245 | * 2/1958 | ............ | 52/690 |
| BR | 555074 | 8/1943 | | |
| CA | 594178 | 11/1951 | | |
| EP | 904690 A1 | * 3/1999 | ........ | A01K/31/22 |
| FR | 2617525 A3 | 1/1989 | | |
| GB | 2359973 A | * 9/2001 | ........ | A01K/31/18 |
| IT | 511262 | 1/1955 | | |
| JP | 253635 | * 11/1991 | ............ | 52/690 |

OTHER PUBLICATIONS

Author: C. Harold Louree, Title: Sectional Steel Building of Rigid–Frame Type, Civil Engineering magazine article, date unknown.

(List continued on next page.)

*Primary Examiner*—Brian E. Glessner
(74) *Attorney, Agent, or Firm*—Gardner Groff, P.C.

(57) ABSTRACT

A method and apparatus for converting a post-style poultry house to a clear span style poultry house. The apparatus includes a truss assembly including a center truss section adapted to be mounted to the roof beams and first and second outer truss sections adapted to be secured to the center truss section. The trusses are installed without the removal of the roof and without removal of the drinker and feeder equipment of the existing post-style poultry house. In installing the trusses, first the center sections of the trusses are attached to the roof beams and then the upper ends of the outer sections are attached to the center sections. Then the lower ends of the outer sections of the trusses are secured to the poultry house footers. Once the truss sections are all secured to each other and secured to the footers, the posts are cut away and removed.

9 Claims, 11 Drawing Sheets

U.S. PATENT DOCUMENTS

| | | | |
|---|---|---|---|
| 3,172,507 A | | 3/1965 | Blyveis |
| 3,184,012 A | | 5/1965 | Fujishima et al. |
| 3,309,120 A | | 3/1967 | Wada |
| 3,462,895 A | | 8/1969 | Wormser |
| 3,530,623 A | | 9/1970 | Burton |
| 3,708,928 A | | 1/1973 | Gaspers |
| 3,832,819 A | | 9/1974 | Houdin |
| 4,809,480 A | | 3/1989 | Hale |
| 4,980,999 A | * | 1/1991 | Terenzoni .................. 52/125.6 |
| 5,076,212 A | * | 12/1991 | Thompson et al. ......... 119/437 |
| 5,189,983 A | | 3/1993 | Aitchison |
| 5,381,634 A | | 1/1995 | Pietrogrande |
| 6,223,476 B1 | * | 5/2001 | Lemoine ........................ 52/22 |

OTHER PUBLICATIONS

Photo of and statement about poultry house by John Hart dated Feb. 14, 2001.

Declaration of David Williamson dated Feb. 15, 2001.

Declaration of Paula Wilson dated Feb. 15, 2001.

Photographs (9) referenced in Declarations of David Williamson and Paula Wilson.by by Floyds' Construction from Arkansas of poultry houses. Website: www.altel.net/~floyds/index.htm.

* cited by examiner

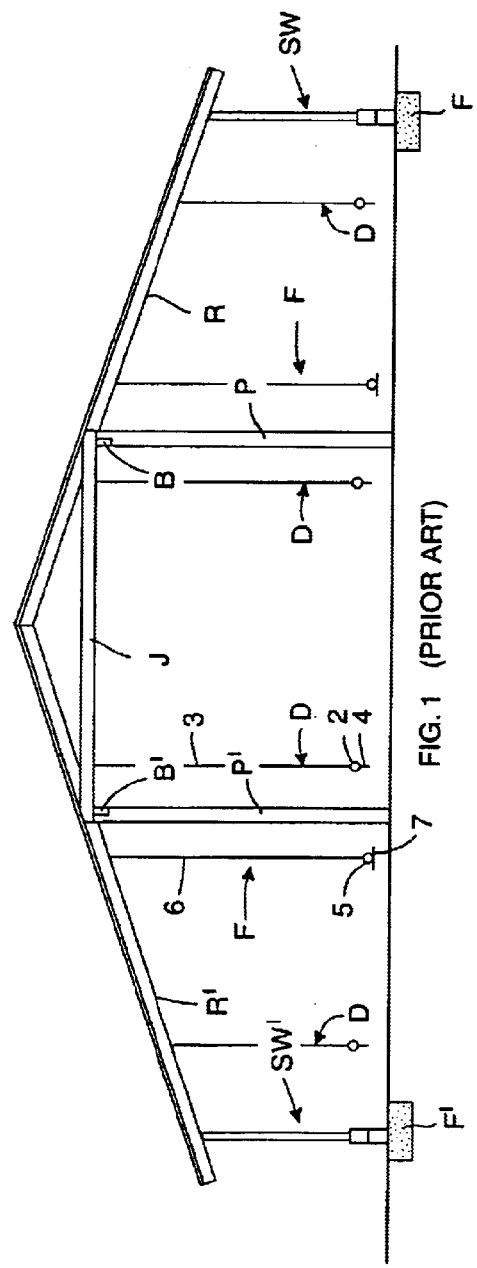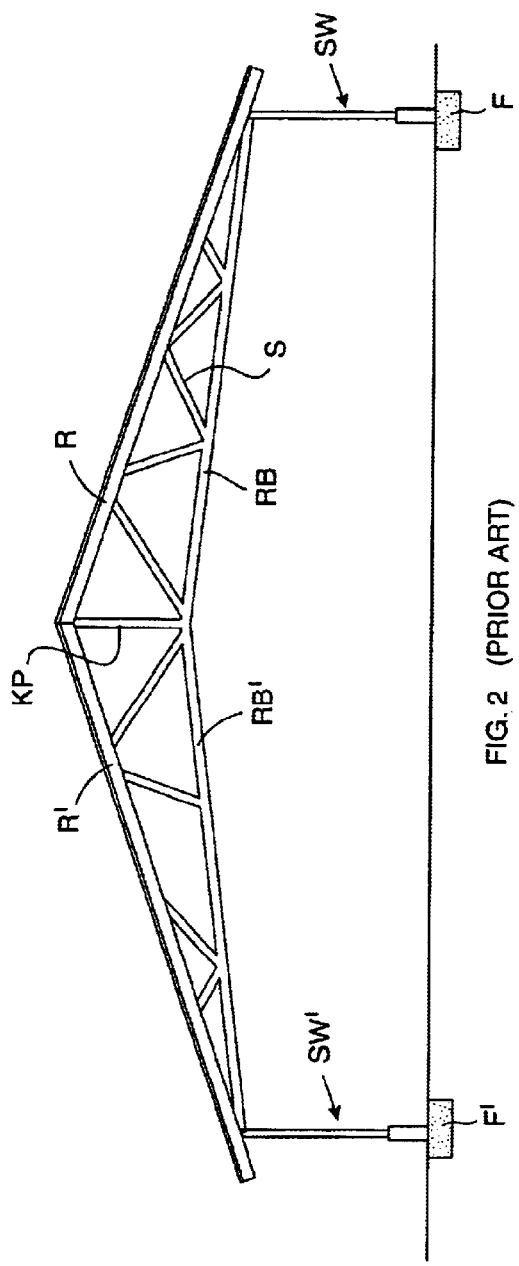

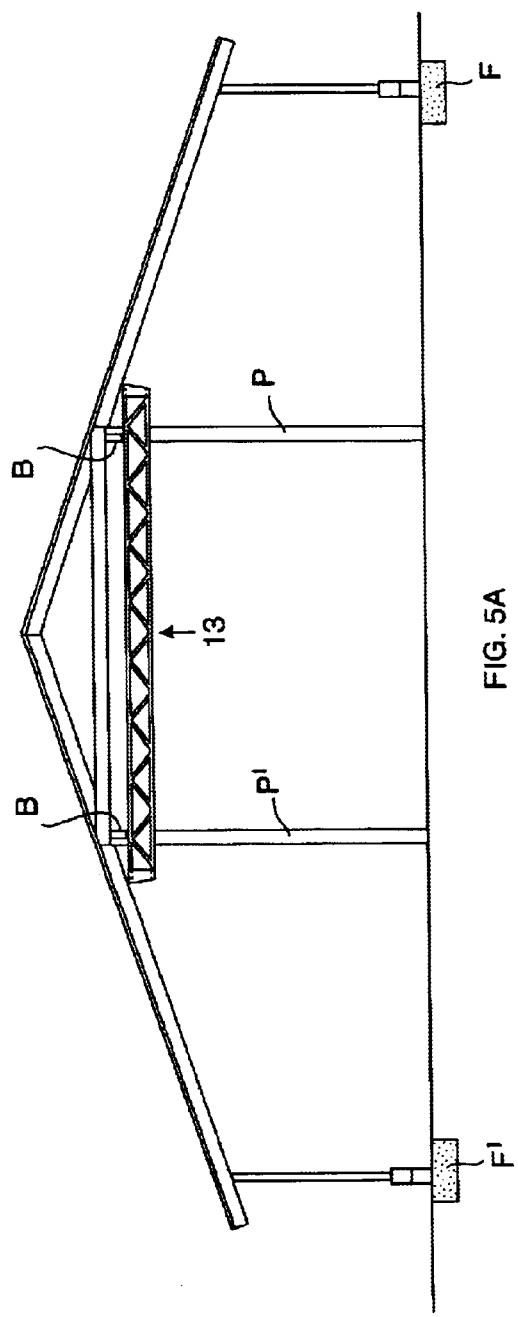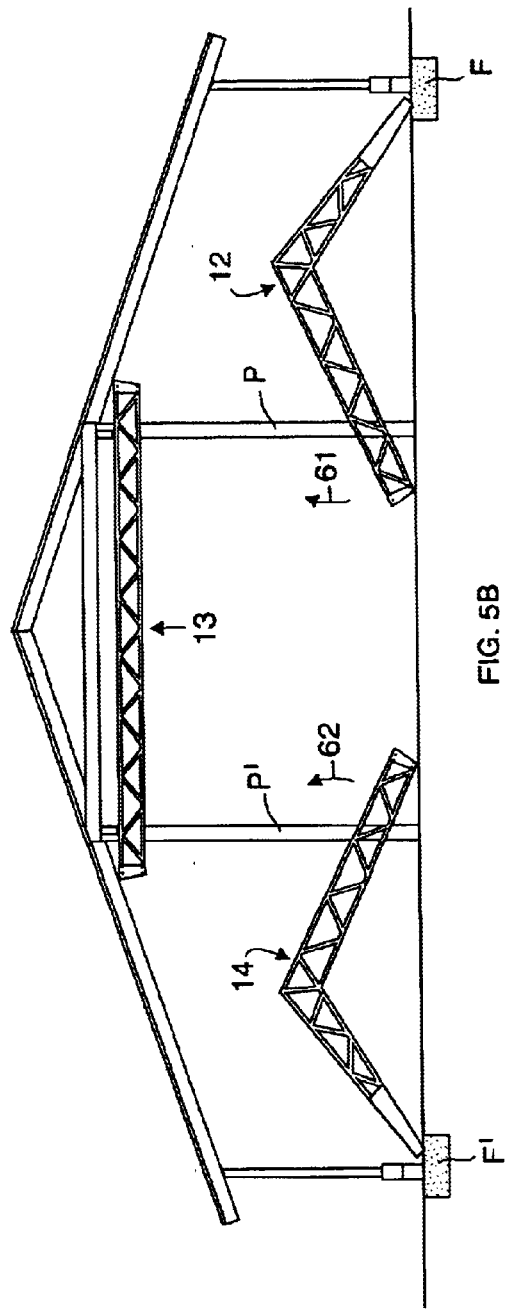

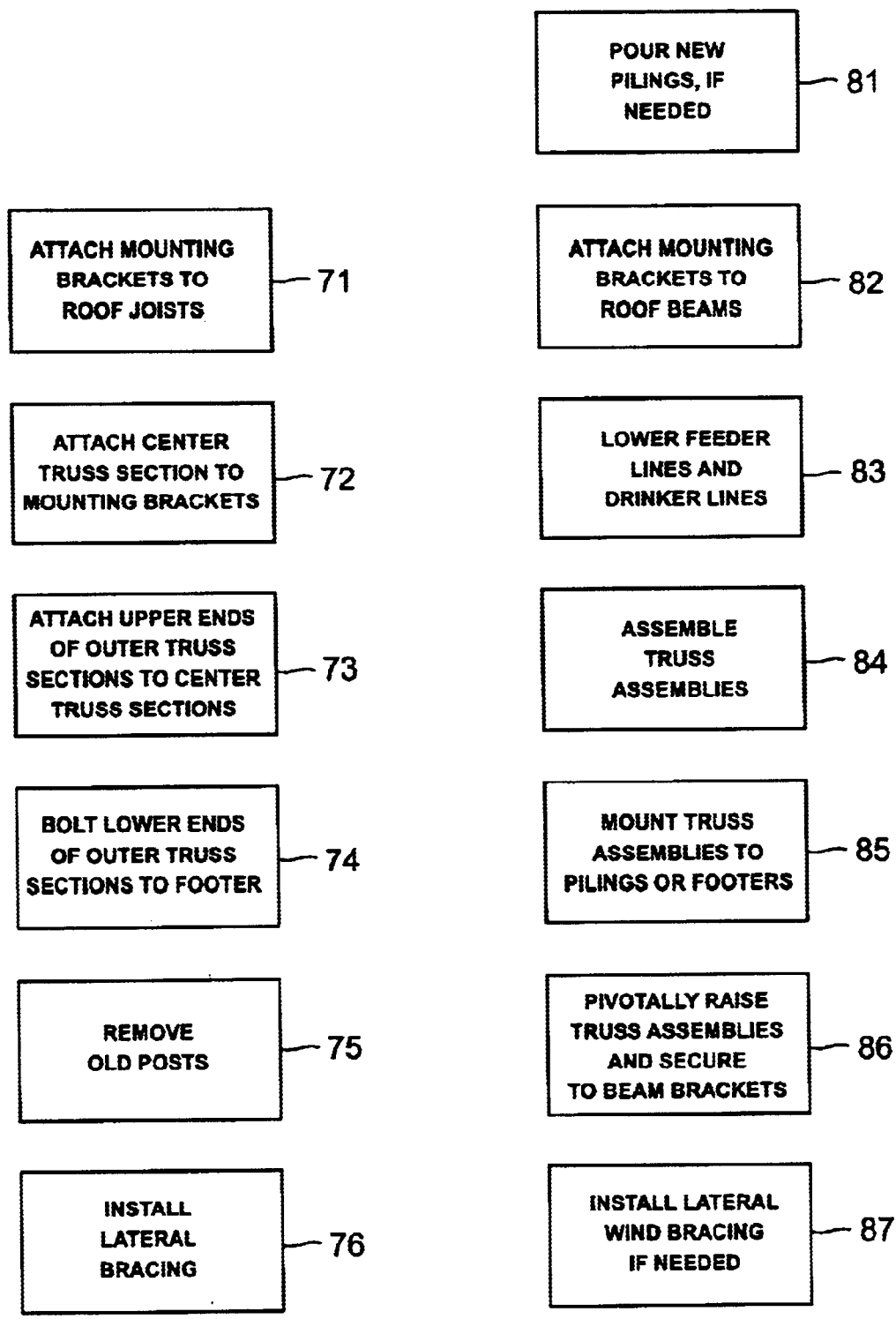

METHOD AND APPARATUS FOR STRUCTURAL CONVERSION OF POULTRY HOUSES

CROSS REFERENCE TO RELATED APPLICATIONS

The present application claims the priority benefit of U.S. Provisional Patent Application No. 60/072,229, filed on Jan. 23, 1998, and is a continuation-in-part of U.S. patent application Ser. No. 09/236,157, filed on Jan. 22, 1999 now U.S. Pat. No. 6,212,850.

TECHNICAL FIELD

The present invention relates to poultry houses in general and in particular relates to a method and apparatus for converting older post-style poultry houses to a clear span-style poultry house.

BACKGROUND OF THE INVENTION

One common style of prior art poultry house is the so called post-style poultry house. These post-style poultry houses are quite prevalent and typically were built using posts prior to the wide spread use of structural trusses. A typical post-style poultry house is between about 34 and 40 feet wide and about 300 to 500 feet long. The posts in such a house are usually spaced from one another and are used to support the roof of the poultry house. Additionally, conventional poultry houses include drinker and feeder equipment, typically suspended from the roof by cables or the like, for providing nourishment such as fluids (usually water) and food (usually chicken feed) to the poultry to enable them to grow and develop rapidly to a desired size for harvesting for edible consumption.

While a post-style house as just described is sturdy and long-lasting, in recent years changes in poultry harvesting technology have made this less than an ideal design for continued use. For example, traditionally, once the poultry are ready to be harvested from the poultry house and to be taken to a processing plant, they are gathered up and placed in cages for transport. Currently, this often is done manually by picking up poultry and putting them in the cages. More recently, automatic harvesting equipment has been developed which constitutes a self-propelled vehicle with equipment at the front end thereof for gathering the poultry and placing them in cages. Such machinery is often provided with side arms that extend across a substantial portion of the width of typical poultry houses, and that can be obstructed in operation by the posts. As a result, there exists a strong economic incentive for replacing the post-style houses with a clear span-style poultry house.

Unfortunately, to simply knock down existing post-style poultry houses and replace them with new, clear span poultry houses is prohibitively expensive for many poultry farmers. Moreover, it is economically wasteful inasmuch as much of the structure and equipment of the post-style poultry house might still be in good shape and need not be demolished and discarded. Therefore, a very strong economic incentive exists for finding a way to convert existing post-style poultry houses to clear span houses that can utilize the new automatic harvesting equipment.

There are several known methods which have attempted to provide for economically accomplishing such conversions. One such method, by Pat Ward Builders of Nicholson, Ga., in about 1986, included the steps of temporarily supporting the side walls of the poultry house with braces, removing the drinker and feeder equipment, removing the roof structure (that is, the beams, joists, rafters, and/or roof surface), installing a clear span scissors type truss structure (similar to FIG. 2), replacing or installing a new roof structure, and replacing or installing drinker and feeder equipment. Due to the time and cost involved in bracing the side walls, removing and replacing the roof structure, and removing and replacing the drinker and feeder equipment, however, this method has not proven to be commercially viable.

Another known method, by Porter Truss of Jefferson, Ga., in about 1998, included the steps of removing the drinker and feeder equipment, removing the roof structure, installing a roof-supporting truss structure, reinstalling the roof structure, replacing or installing drinker and feeder equipment, and then after all of this, removing the posts. While the method may not require bracing the roof structure or side walls, it nevertheless involves removing and replacing the roof structure and the drinker and feeder equipment, thereby rendering it too costly and time consuming for most poultry farmers.

Yet another known method, by Ivester Construction of Clarksville, Ga., in about 1996, included the steps of removing the feeder and drinker equipment, installing a tubular steel roof-supporting structure, reinstalling or replacing the feeder and drinker equipment, and then after all of this, removing the posts. Because the tubular steel structure is heavy (two sections each weighing about 500 pounds) and quite cumbersome, it was raised up to the roof by a tractor (or other piece of heavy equipment). In order to get the tractor into the poultry house to install the tubular steel, therefore, the feeder and drinker equipment was removed and replaced afterward. Although this method did not require removing and replacing the roof structure, the time and cost involved in removing and replacing the feeder and drinker equipment make it, too, generally unsatisfactory.

Still another method, as it is currently understood, by Floyd Construction of Berryville, Ark., involved either disturbing or replacing the beams of the roof structure and/or assembling a roof-supporting truss structure on-site prior to removing the posts. Again, this method appears to involve such substantial time and cost that it has not been widely accepted as being commercially viable. The aforementioned methods are described to the best of the applicant's knowledge, based on information known or and/or provided by others.

In converting post-style poultry houses to clear span houses, not only is the cost of materials and labor of importance, but also is the time involved. The typical poultry farmer raises a flock of poultry over about a 6 to 7 week cycle, usually growing about 5 to 6 flocks per year, depending on the desired size of the poultry and the seasonal market demands. The typical downtime between growing cycles is about one to two weeks. It is of paramount importance that the poultry growing cycle not be interrupted by the downtime required to accomplish the conversion, or the poultry farmer will miss a flock growing cycle and incur a substantial profit loss. The known conversion methods described above each require on the order of about three to four weeks or more to accomplish the conversion. Because the time involved in carrying out these conversion methods results in the poultry farmer missing a flock, none of them has proven to be acceptable to poultry farmers, in spite of the need for such a method.

Accordingly, it can be seen that a need yet remains for a method and apparatus for economically converting post-style poultry houses to clear span poultry houses. More particularly, a need remains for a conversion method that can be accomplished in about a week or so, during the typical downtime between growing cycles. It is to the provision of such a method and apparatus that the present invention is primarily directed.

SUMMARY OF THE INVENTION

Briefly described, in a first preferred form the present invention comprises a method for converting a post-style poultry house to a clear span-style poultry house. The poultry house is of the type mounted on footers and including a roof, inclined rafters supporting the roof, and roof beams extending transversely to the rafters and supporting the rafters thereon. Initially, the post-style poultry house has uprights posts supporting the roof beams. The method comprises the steps of (a) installing a series of trusses for supporting the roof beams, and (b) removing the upright posts from the poultry house. The step of installing the series of trusses is carried out without the removal of the roof or beams, and without the removal or replacement of the feeder and drinker equipment. The trusses are provided for supporting the roof beams and the roof thereon.

As one example, each of the trusses can have a center section and two outer sections. The step of installing the trusses comprises (i) attaching the center sections of the trusses to the roof beams, (ii) attaching upper ends of the outer sections to the center sections, and (iii) securing the lower ends of the outer sections to the footers. Preferably, the step of attaching the center sections to the roof beams comprises attaching mounting brackets to the roof beams and then attaching the center sections to the mounting brackets. Preferably, the center sections are bolted to the outer sections. Also preferably, prior to the completion of the installation of the trusses, any feeding lines or watering lines in the poultry house are lowered.

As another example, each of the trusses can have only two sections, and the step of installing the trusses comprises (i) positioning lower ends of the truss sections in place on footers, (ii) lifting the truss sections in their final position, (iii) attaching the truss sections together and to the roof structure, and (iv) securing the lower ends of the truss sections to the footers. Of course, any number of truss sections can be provided, as may be desired in a particular situation.

Alternatively, the step of installing the trusses comprises assembling truss sections into assembled trusses, positioning the assembled trusses under and adjacent the roof beams, and securing the assembled trusses thereto. Preferably, the truss sections are assembled on-site at the poultry house. Also preferably, the trusses are pivotally mounted to the footers (or pilings) and pivoted up into their final position under and adjacent the roof beams.

In another preferred form, the invention comprises a truss apparatus for converting a post-style poultry house to a clear span-style poultry house. The poultry house includes a roof, inclined rafters supporting the roof, roof beams extending transversely to the rafters and supporting the rafters thereon, side walls, and footers supporting the side walls. Initially, the house includes upright posts for supporting the roof beams. The truss apparatus includes a center truss section adapted to be mounted to the roof beams. The truss apparatus further comprises first and second outer truss sections adapted to be secured to the center truss section. The outer truss sections each comprise substantially upright portions and an inclined portion extending therefrom. Alternatively, the truss apparatus can have only the first and second outer sections without the center section, with the outer sections dimensioned to span the house, connect together, and support the roof.

Preferably, each of the truss sections are made of a corrosion-resistant metal. Most preferably, the truss sections are galvanized steel or stainless steel. Further, preferably the truss apparatus includes mounting brackets for mounting the center truss section to the roof beams. Also preferably, mounting feet pivotally mount the lower ends of the substantially upright portions of the outer truss sections to the footers. Also preferably, end portions of the center truss sections and end portions of the first and second truss sections each include mounting flanges for bolting the center truss sections to the first and second outer truss sections.

Accordingly, the present invention provides for economically converting post-style poultry houses to clear span houses, without removing or otherwise disturbing the roof structure and/or the drinker and feeder equipment, and using pre-assembled truss sections that are relatively lightweight and easily installed manually or otherwise without heavy equipment such as a tractor or the like, so that the growing cycle of the poultry is not interrupted.

BRIEF DESCRIPTION OF THE DRAWINGS

FIG. 1 is a sectional end view of a prior art post-style poultry house, showing a typical roof structure with joists, beams, rafters, and a roof surface, and typical roof-suspended drinker and feeder equipment.

FIG. 2 is a sectional end view of a prior art "scissor truss" poultry house.

FIGS. 5A through 5C depict the appearance of the post-style poultry house as it is converted to a clear span-style poultry house according to the present invention.

FIG. 6 is a block diagram of a method according to the present invention for converting a post-style poultry house to a clear span-style poultry house.

FIG. 7 is a block diagram of another method according to the present invention for converting a post-style poultry house to a clear span-style poultry house.

DETAILED DESCRIPTION OF THE PREFERRED EMBODIMENTS

Figure 1A:
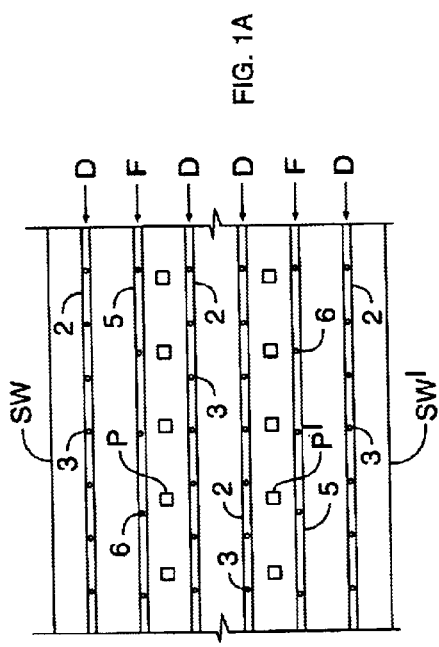
FIG. 1A is a partial plan view of the poultry house of FIG. 1, showing the drinker and feeder equipment.

Referring now in detail to the drawing figures, wherein like reference numerals represent like parts throughout the several views, FIG. 1 shows a prior art post-style poultry house. The poultry house shown typifies those poultry houses which were built using posts prior to the wide-spread use of roof trusses. Such a poultry house typically is 34–40 feet wide and 300–500 feet long. The posts in the house, such as P and P' are on 12 foot centers. That is, posts P and P' are approximately 12 feet from each other and also about 12 feet from the side walls SW, SW'. The posts are spaced 12 to 16 feet apart longitudinally. In such a post-style house, there would be two rows of posts running the length of the house, with the rows being about 12 feet apart.

As shown in FIG. 1, the post-style house rests upon a foundation or footer, F, F', and includes side walls positioned thereupon SW, SW'. The side walls include a lower portion which is (typically) concrete block and an upper portion which is a wood frame construction. The house has a roof structure that typically includes rafters, such as rafter R and R', which are supported by the side walls and longitudinal roof beams B, B'. The beams run the length of the poultry house and are supported upon the posts P, P'. Joists J are connected to the rafters, extend between the posts P, P', and rest atop the beams B, B'.

Furthermore, conventional poultry houses have drinker equipment D and feeder equipment F for providing nourishment to the growing poultry in the house. Typically, the drinker equipment D includes three hollow elongate members 2 such as tubes or pipes for carrying water, that each run a substantial length of the house and are suspended from the roof structure by a cable 3 or the like, with nipples 4 or the like connected to the hollow members for the poultry to access the water. Also, the feeder equipment F typically includes three hollow elongate members 5 such as tubes or pipes for carrying chicken feed or the like, that each run a substantial length of the house and are suspended from the roof structure by a cable 6 or the like, with pans 7 or the like connected to the hollow members for the poultry to access the feed. Because of the web of elongate members 2, 5 and cables 3, 6 throughout the house, it can be appreciated that the inside of a typical poultry house is not ordinarily able to accommodate heavy equipment such as tractors (see also FIG. 1A).

One example of a clear span-style poultry house is shown in FIG. 2, which depicts a "scissor truss" type of poultry house. The scissor truss-style house includes a generally delta-shaped truss including the rafters R, R', the ridge beams RB, RB', the king posts KP, and the struts, such as strut S.

Such poultry houses as shown in FIG. 2 are more modern than the prior post-style houses as shown in FIG. 1. As a result of the clear span between the side walls, the scissor truss-style of poultry house of FIG. 2 offers important advantages over the post-style house of FIG. 1. One such advantage, in addition to the greater convenience for harvesting equipment, is greater convenience for cleaning out the poultry litter using a tractor. However, one disadvantage of the scissor-type clear span-style poultry house is that not as much clearance is provided beneath the roof for usable space. In the post-style house as depicted in FIG. 1, the roof typically has a 4/12 pitch where there is a four foot rise for every 12 foot of span. In the scissor truss house of FIG. 2, the upper rafter R, R' has a minimum of 5/12 rise, while the lower ridge beam RB, RB' has only a 2/12 rise. Therefore, this makes for a lower ceiling inside the poultry house.

The present invention relates to the conversion of a post-style house as depicted in FIG. 1 to provide a clear span between the side walls, similar to the span available in the scissor truss house of FIG. 2. Moreover, the present invention is directed to a method and apparatus by which a post-style house can be economically converted to a clear span house without requiring the removal or replacement of any components of the roof structure (the beams, joists, rafters, or roof surface), and/or without requiring the removal of the drinker and/or feeder equipment. This can result in a very substantial cost savings, in comparison with alternative ways of doing away with the posts.

Figure 3:
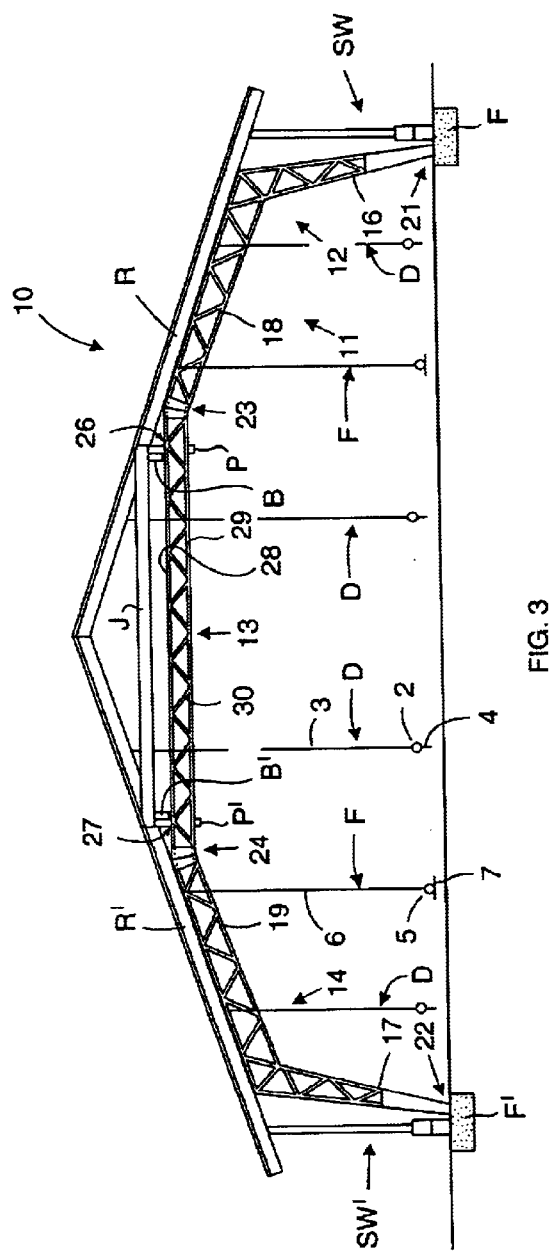
FIG. 3 is a sectional end view of a converted poultry house according to the present invention wherein posts have been removed and new trusses added without removing the roof structure or drinker or feeder equipment.

Referring now to FIG. 3, a converted poultry house 10 is shown according to a preferred form of the invention. The converted poultry house 10 includes pre-existing footers F, F' and side walls SW and SW'. In some existing post-style poultry houses, the footers are too small and/or are structurally inadequate for converting the house, and it may be necessary to augment the footers, such as with auxiliary poured concrete pilings. The present inventor has found that a good way to provide such pilings is to bore holes using a large auger, place tubular forms in the holes, and fill the forms with high-strength concrete. Moreover, the converted poultry house 10 also includes preexisting roof rafters R, R' and roofing material thereon. The converted poultry house 10 roof structure also includes pre-existing roof beams B, B' and joists, such as joist J.

The converted poultry house 10 also includes a truss apparatus, such as first exemplary truss apparatus 11, mounted to the footers, F, F' and to the roof structure at, for example, the beams B, B', the rafters R, R', or the joist J. Alternatively, the truss apparatus 11 can be mounted atop auxiliary pilings or other footer structures at the bottom and/or to other roof structures at the top, depending on the particular house to be converted. The truss apparatus includes a first truss section 12, a second truss section 13 and a third truss section 14. The first truss section 12 is an outer truss section, as is truss section 14. Each of the outer truss sections includes a substantially upright lower portion 16, 17 and an inclined portion 18, 19 extending therefrom toward the center truss section 13. The lower ends of the lower portions 16, 17 are mounted to the footers using pivotal mounting feet 21, 22 as will be described in more detail in connection with another drawing figure. The other ends (the uppermost ends) of the outer truss sections are bolted to the ends of the center truss section 13 and indicated at 23 and 24. This also will be discussed in more detail in connection with another drawing figure.

Each of the truss sections 12–14 is made up of angled steel which preferably has been pre-assembled such as by welding the truss components together to form the individual truss sections. The truss section components can be hot-dip galvanized to resist the rather caustic environment of a poultry house (inside the poultry house often contains strong concentrations of ammonia as a result of the poultry urine on the floor). By fabricating and galvanizing the individual truss sections, the resulting truss is highly resistant to corrosion once installed. Other corrosion-resistant treatments could be employed or the trusses could be made from stainless steel or another material known in the art. Also, by pre-assembling the truss sections, the on-site assembly time is substantially reduced.

By using such truss sections, the present invention provides a relatively lightweight roof-supporting structure (each assembled truss can weigh about 440 pounds, less than half the weight of one assembled Ivester tubular roof-supporting structure) that can be quickly and easily installed in the poultry house. In this manner, the truss sections can be raised into place manually, or by a hydraulic lift or by other light equipment, so that heavy equipment such as a tractor is not needed to convert the poultry house. Therefore, the truss sections can be lifted into place while the drinker and feeder equipment is still in the house. This is a substantial improvement over the known conversion methods and apparatus which require the use of a tractor or other heavy equipment to lift heavy roof supports into place and thereby require that the drinker and feeder equipment first be removed in order to operate the tractor in the house. Poultry house conversion by the present invention thereby results in a substantial time savings when carrying out the conversion.

To connect the center truss 13 to the roof structure, brackets 26, 27 are mounted to the beams B, B' (or elsewhere on the roof structure) and then secured to the center truss section 13. This feature will be described in more detail in connection with a subsequent drawing figure.

Each of the truss sections is made from angled steel to form upper and lower chords, such as upper chord 28 and lower chord 29 of center truss section 13. Also, a large number of steel webs, such as web 30, are welded to and extend between the upper and lower chords. As is conventionally known, such webs tend to make the truss very rigid and help to distribute and carry the load thereon. Alternatively, the truss sections can be provided by lengths of steel tubing, I-beams, lattice members, or other support structures selected for high strength.

Figure 4:
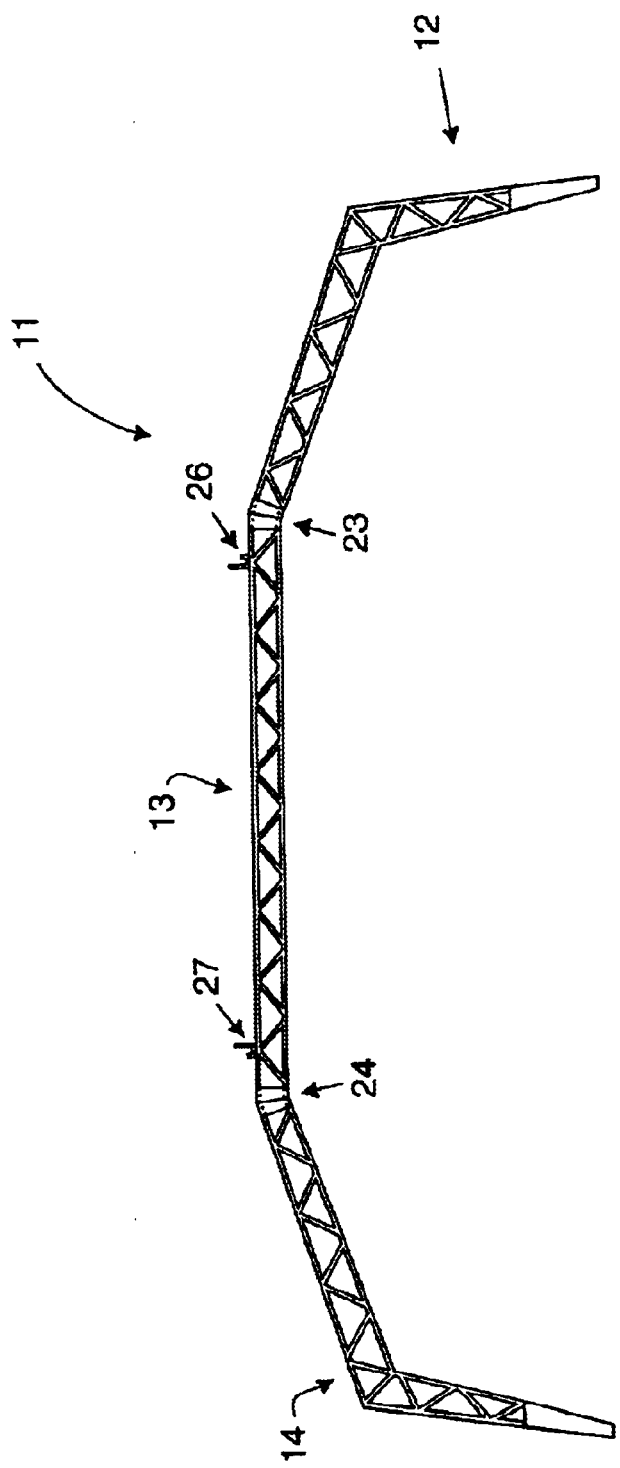
FIG. 4 is an illustration of a first exemplary truss according to the invention of FIG. 3.

FIG. 4 shows the truss assembly 11 in isolation including the outer truss sections 12 and 14 and the center truss section 13. Upper mounting brackets 26 and 27 are provided for connection to the roof structure. In this exemplary embodiment, two upper mounting brackets are provided for each assembled truss, however, more or less upper mounting brackets can be provided as may be desired in a given application.

Figure 4A:
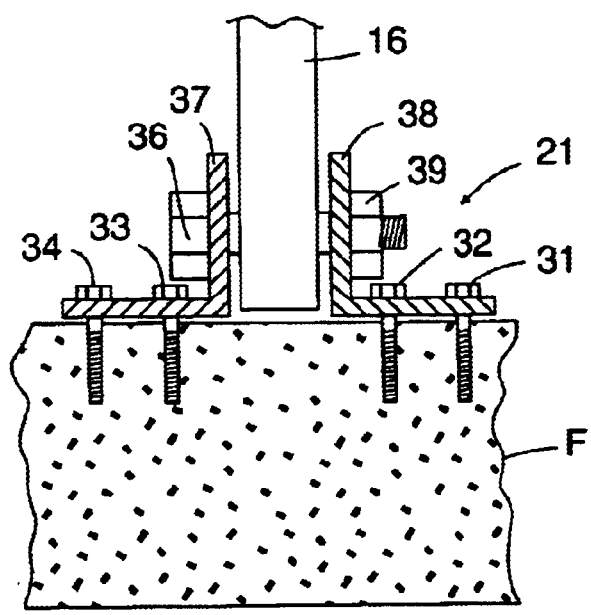
FIG. 4A is a detailed sectional view of a pivotal mounting foot portion of the truss of FIG. 3.

FIG. 4A shows in detail a pivotal mounting foot 21 for pivotally mounting a lower portion 16 of outer truss section 12 to the footer F. In this regard, the pivotal mounting foot 21 straddles the lower-most portion of the outer truss section and is bolted to the concrete footer F using bolts, such as bolts 31–35. A clevis bolt 36 extends through an upstanding flange 37, through the truss section 16, and through an opposing upstanding flange 38 and is secured in place with a threaded nut 39. The shaft of the clevis bolt 36 acts as a pivot pin about which the outer truss section can pivot. As will become apparent subsequently, this can greatly ease the installation of the outer sections of the truss assembly. Alternatively, another pivotal mounting structure can be suitably employed, such as a yoke, a curved flange mounted on the bottom of the truss, a geared mechanism, or another pivotal mounting structure known in the art.

Figure 4B:
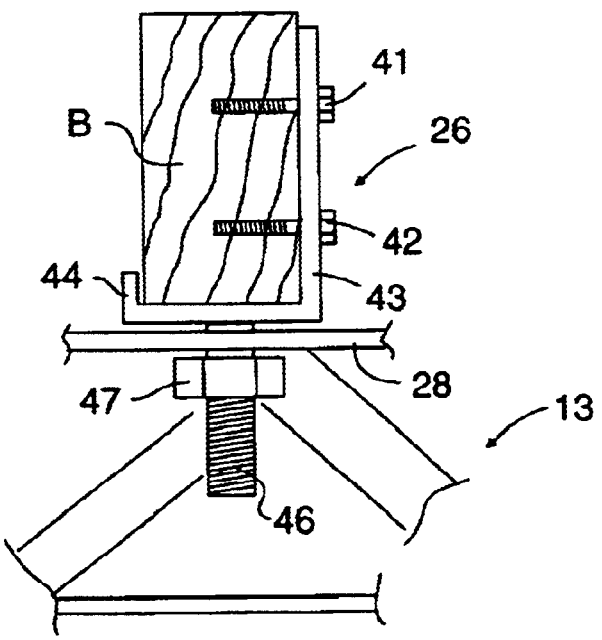
FIG. 4B is a detailed sectional view of an upper mounting bracket portion of the truss of FIG. 3 for mounting a center truss section to a roof joist.

FIG. 4B shows the construction and operation of one of the upper mounting brackets, such as bracket 26, in greater detail. The bracket 26 is shown bolted to a wood roof beam B using threaded bolts 41 and 42. As can be seen in FIG. 4B, the bracket 26 is generally J-shaped to present an upright flange 43 for securement to the side of the beam. A short second upright flange 44 helps to capture the beam B and to accurately position the bracket relative to the beam. A large footed stud or bolt 46 extends through the upper chord 28 of the center truss section 13 and secures the center truss section against the mounting bracket with a corresponding nut 47.

Alternatively, the upper mounting brackets can be provided by a U-shaped bracket, a flat plate, an L-shaped bracket, or another type of bracket, mounted to the bottom, side, and/or top of the beam B. While the brackets are shown mounted to the beam B, alternatively they can be mounted to the rafter R, the joist J, or another component of the roof structure. Also, washers or slugs can be disposed between the bracket 46 and the upper chord 28 of the truss section to position the bracket higher relative to the truss section, and the bracket can swivel about the bolt 46, thereby providing flexibility for use in slightly different sized poultry houses.

Figure 4C:
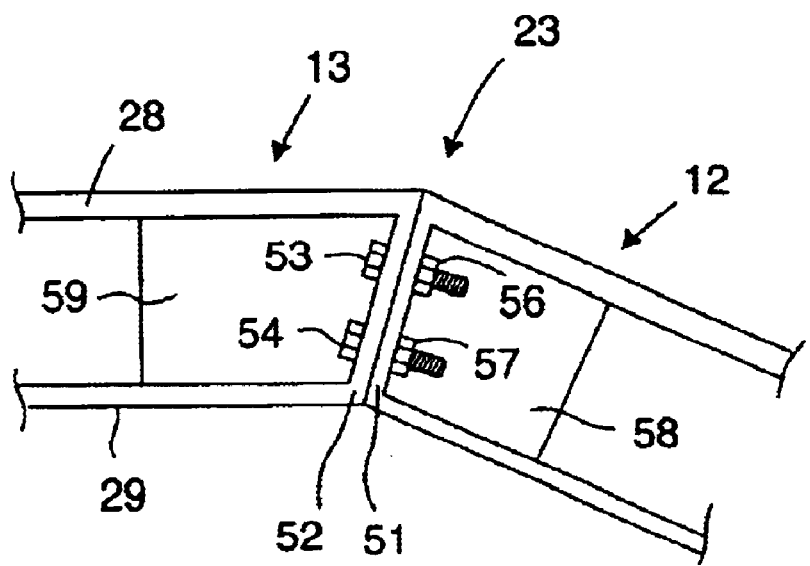
FIG. 4C is a detailed sectional view of a portion of the truss of FIG. 3, showing the bolted-together connection of the center and outer truss sections.

FIG. 4C shows the connection between the outer truss sections and the center truss section, with a bolted connection 23 depicted here. As can be seen in this figure, the outer truss section 12 includes an end flange 51, while the center truss section 13 includes a corresponding end flange 52. The end flanges 51 and 52 are configured and positioned to face and match each other and are secured to each other using bolts 53 and 54 and nuts 56 and 57. The end flanges 51 and 52 are reinforced by trapezoidal webs 58 and 59 which are welded on three sides to the upper and lower flanges and the end flanges of each of the truss sections.

Figure 4D:
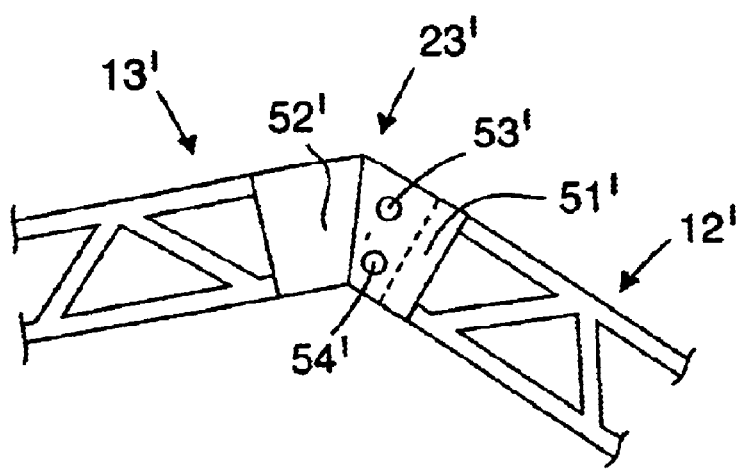
FIG. 4D is a detailed sectional view of a portion of the truss of FIG. 4C in a modified form.

FIG. 4D shows an alternative connection 23' between the outer truss sections and the center truss section. As shown in FIG. 4D, each truss section includes side flanges, such as side flanges, which can be place one against another and manipulated until bolt holes are aligned to receive bolts 54', 54' to secure the truss sections together, such as truss sections 12' and 13'. Alternatively, the truss sections can be connected together by screws, welding, telescopic members, or other connections known in the art.

To guard against corrosion, all of the fasteners used in connection with the truss assembly are made of stainless steel. Alternatively, other corrosion-resistant fasteners can be employed, such as hot-dip galvanized structural fasteners.

Figure 5C:
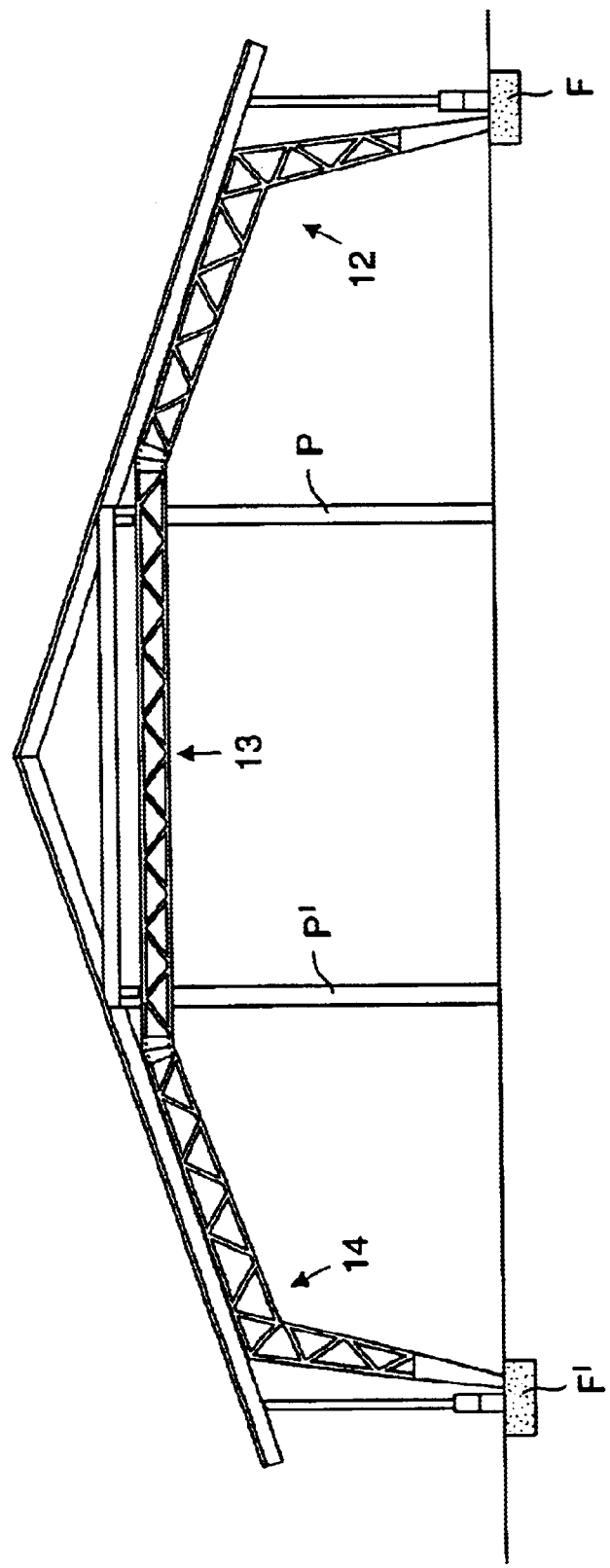

FIGS. 5A through 5C depict the sequence of major operations in converting the post-style poultry house of FIG. 1 into a converted poultry house according to FIG. 3, according to a preferred form of the invention. As shown in FIG. 5A, the first major step is to mount the center truss section 13 to the roof structure such as at beams B, B'. With the center section 13 positioned and secured, the next step is to position and secure the outer sections 12 and 14. As shown in FIG. 5B, the outer truss sections 12 and 14 can be positioned with their bottom-most portion (including their mounting feet) in the desired final position on the footers, and then lifted up so that the opposite ends of the outer truss sections 12 and 14 are moved in the direct of direction arrows 61 and 62 until the final position of FIG. 5C is achieved. Once the outer truss sections 12 and 14 are in this position, they are connected to the ends of the center truss section as depicted in FIG. 4C. The mounting feet the outer truss sections can be connected to the concrete footers before or after the outer truss sections are pivoted up into their raised position.

In this regard, the mounting feet have two nice advantages. Firstly, the pivotal nature of the mounting feet helps in raising the outer truss sections into position smoothly and safely. Secondly, the pivotal mounting feet ensure that the mounting of the outer truss sections to the concrete footers can be accomplished without special alignment concerns. In this regard, the pivotal mounting feet quickly and automatically conform to the upper surface of the concrete footers.

With the truss assembly now complete, connected together and connected to the concrete footers and the beams, all that remains is to cut off the posts P, P' and to remove them to achieve the clear span, converted poultry house configuration of FIG. 3. Of course, the posts P, P' can be removed earlier in the process and the center truss section mounted to the rafters R, R', the joist J, or another component of the roof structure, as may be desired. Also, it will be understood that one truss assembly can be provided for each row of posts, more than one truss assembly can be provided for each row of posts, or truss assemblies can be provided for less than all of the rows of posts, depending on the strength of the trusses and the support needed for the roof structure.

As is succinctly depicted in FIG. 6, the method according to the present invention of converting the post-style house as just described into a converted clear span poultry house comprises five primary steps. Firstly, as shown in process step box 71, the first step is to attach the mounting brackets to the roof joists. As shown in process step box 72, the next step is to attach the center truss sections to the mounting brackets. As shown in process step box 73, the next step is to attach the upper ends of the outer truss sections to the center truss sections. As shown in process step box 74, the next step is to bolt the lower ends of the outer truss sections to the footers. Finally, as shown in process step box 75, the final step is to remove the old posts. Furthermore, steps 75 and 76 can be done simultaneously which includes installing lateral bracing and removal of posts. It will be appreciated that the method does not require removal and replacement of the any component of the roof structure or of the drinker or feeder equipment.

Alternatively, as shown in FIG. 7, the post-style poultry house can be converted to a clear span poultry house according to another form of the invention. As depicted in FIG. 7, preferably, the first step 81 comprises pouring new auxiliary concrete pilings, if necessary. Secondly, the next step preferably comprises attaching beam mounting brackets to the roof beams. Preferably, the next step 83 comprises lowering any feeder lines or drinker lines to provide better access. Preferably, the next step 85 comprises placing individual truss components within the poultry house near the particular place to be installed and assembling the individual components into completed individual truss assemblies. Preferably, the next step 85 comprises mounting the completed truss assemblies to the pilings (or to existing footers) with pivotal mounting feet. Preferably, the next step 86 comprises pivoting the truss assemblies upwardly about the pivotal mounting feet to bring the truss assemblies to beneath and adjacent the beam mounting brackets and securing the truss assemblies thereto. Preferably, the next step 87 comprises installing lateral wind bracing, if needed. With the trusses thus pivotally mounted to the pilings or footers, it is important to install such lateral bracing to rigidify the collective trusses longitudinally (lengthwise along the poultry house). Such bracing can be in the form of cables or struts.

One advantage to the method of claim 7 over the method of claim 6 is that the assembly of the individual truss sections into a completed truss can take place at ground level, instead of doing so overhead. Working with the truss sections overhead is more tiring than working with them at ground level.

Figure 8:
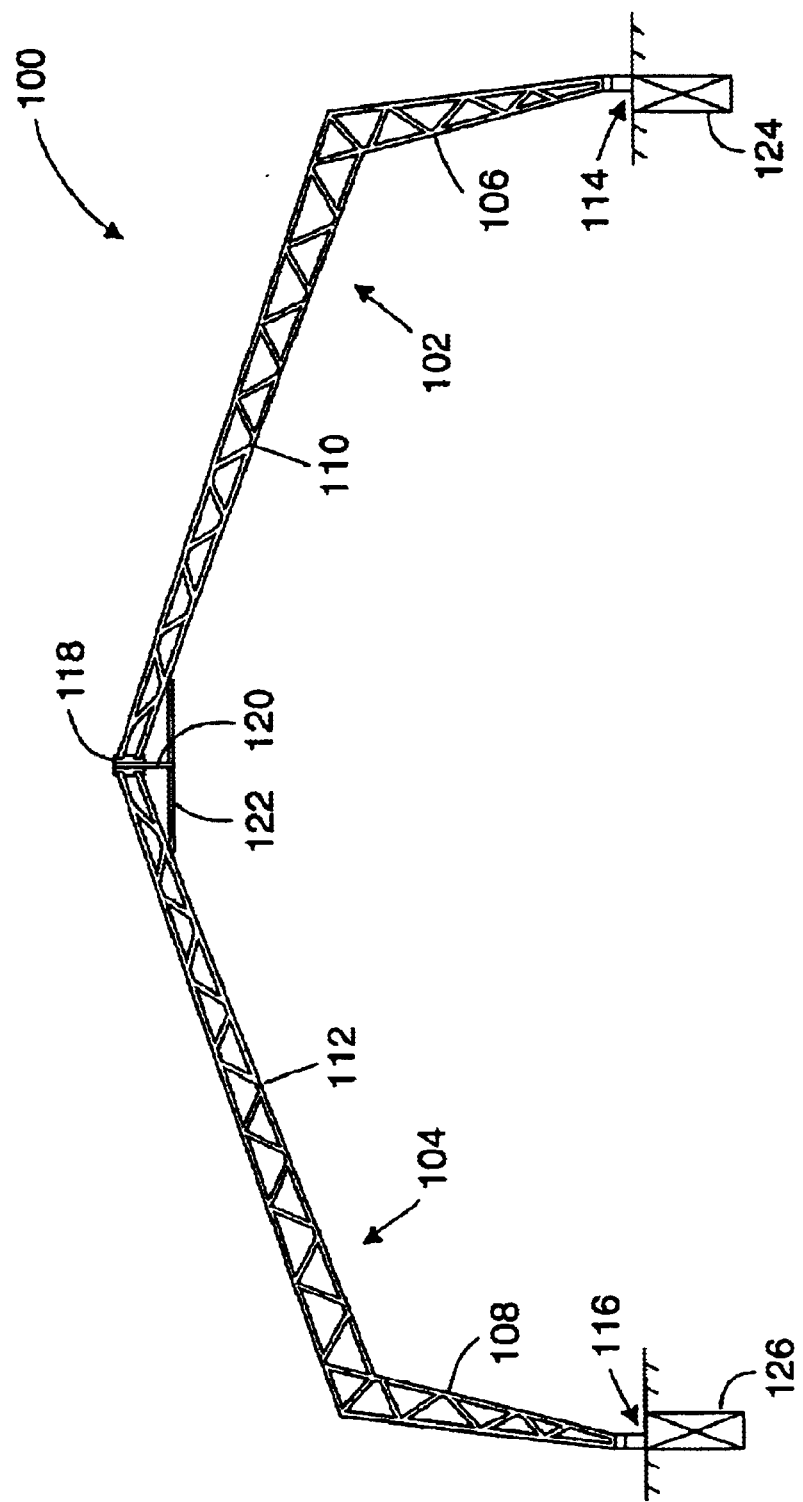
FIG. 8 is an illustration of a second exemplary truss according to the present invention.

Referring now to FIG. 8, there is illustrated a second exemplary embodiment of the present invention, referred to generally as truss apparatus 100. The truss apparatus 100 is similar to the above described truss apparatus 11, in that it has truss sections 102 and 104 (similar to outer truss sections 12 and 14). The truss sections 102, 104 have a substantially upright portion 106 and 108 (similar to 16 and 17) and an inclined portion 110 and 112 (similar to 18 and 19). The substantially upright portions 106 and 108 have pivotal mounting feet 114 and 116 (similar to 21 and 22).

In the second embodiment, however, the truss sections 102 and 104 are sufficiently long and strong enough to be connected together without the center truss section of the previous embodiment. This arrangement can be advantageous in implementing the conversion method of the present invention because there are only two truss sections to be assembled together on site. Another advantage of this arrangement is that, without the center truss section, there is provided greater clearance above the ground. Of course, where the poultry house does not have a door or other access opening that is sufficiently large to get the larger truss sections into the house, the truss apparatus can be provided with four smaller truss sections that can be assembled on site. Alternatively, any other number of truss sections can be used, as may be desired in a given application.

In order to connect the truss sections 102 and 104 together, there is provided a connector plate 118, a substantially vertical support member 120, and a substantially horizontal support member 122. The connector plate 118, vertical support member 120, and substantially horizontal support member 122 are connected together by bolts or other conventional fasteners or fastening techniques such as welding. Also, the connector plate 118, vertical support member 120, and substantially horizontal support member 122 can be made of steel or another material selected for strength and durability. Alternatively, the truss sections 102 and 104 can be connected together by the bolting arrangements described above with respect to the truss apparatus 11, or by other truss connecting structures or methods known in the art.

Figure 9:
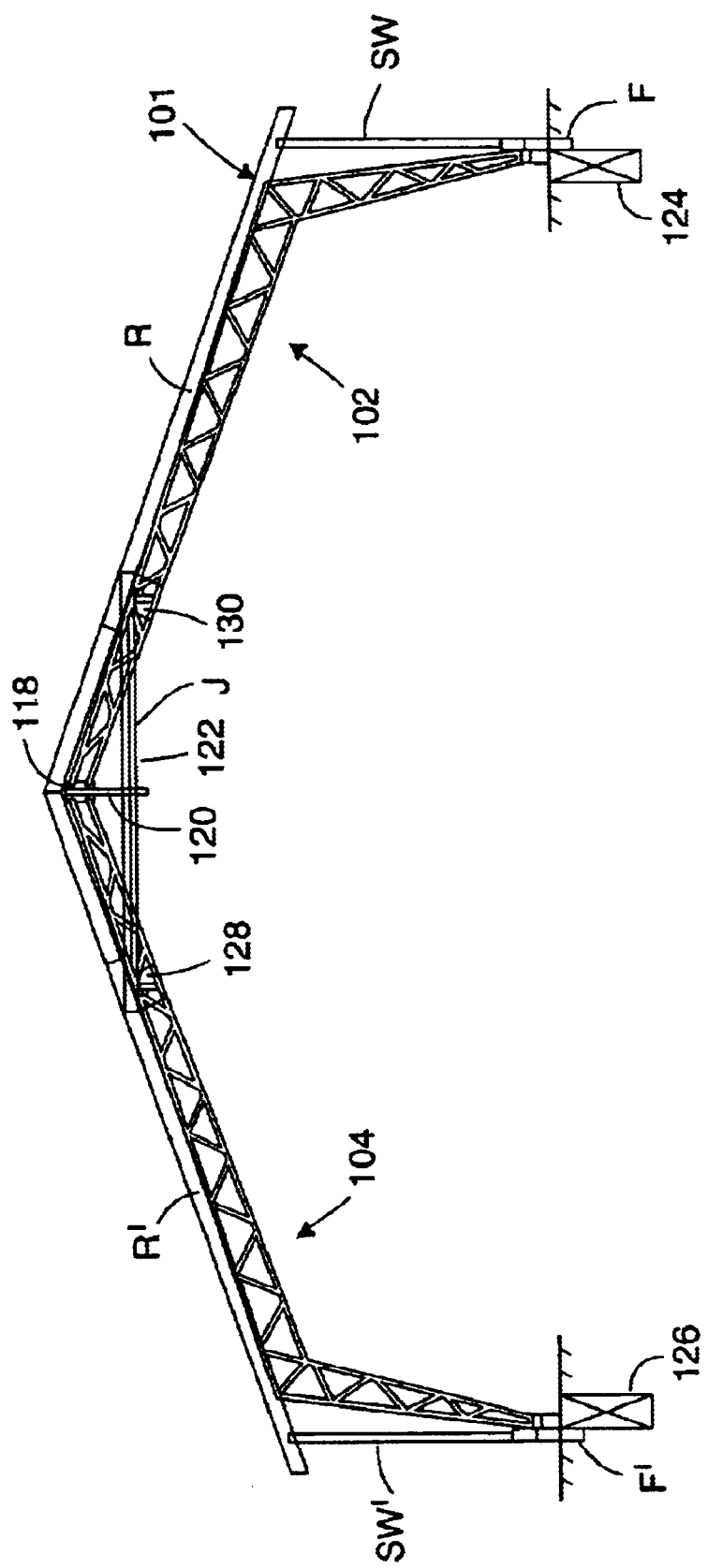
FIG. 9 is a sectional end view of a converted poultry house according to the present invention wherein posts have been removed and the second exemplary truss of FIG. 8 added.
Figure 10:
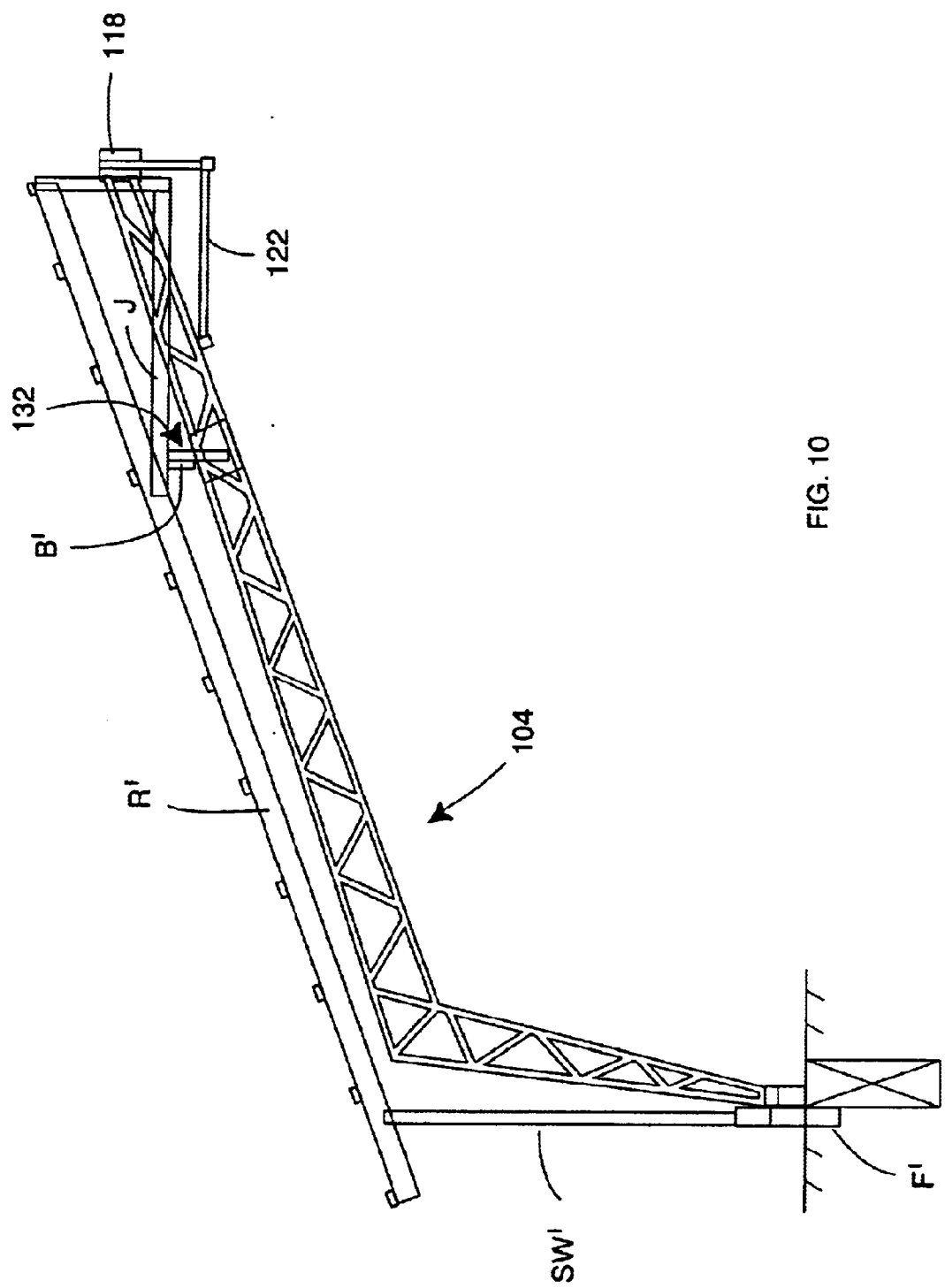
FIG. 10 is a sectional end view of a portion of a converted poultry house, showing alternative mounting brackets used with the second exemplary truss of FIG. 8.

Referring to FIG. 9, there is shown a converted clear span poultry house 101 with the truss apparatus 100 installed therein. The pivotal mounting feet 114 and 116 can be mounted on pre-existing footers F and F', or auxiliary footers such as pilings 124 and 126 can be provided, as described above. The truss sections 102 and 104 can be mounted to the roof structure by mounting plates 128 and 130 to the truss sections 102 and 104 and to the rafter R' or the joist J. Alternatively or additionally, the substantially horizontal support member 122 can be attached to the joist J for additional support. In another alternative shown in FIG. 10, a mounting bracket 132 can be provided that is similar to mounting bracket 26 described above and shown in FIG. 4C. Alternatively or additionally, the plate 118 can be attached to a pre-existing vertical roof member 119 of the poultry house for additional support. Of course, other mounting brackets or structures can be used to mount the truss to the roof.

In the above-described methods of converting post-style poultry houses to clear span houses, there is achieved a substantial savings in time not realized by the known prior art methods and apparatus. Because of the unique apparatus and methods provided by the present invention, the poultry house conversion can be carried out without disturbing the roof structure or the drinker and feeder equipment. Therefore, the conversion can be typically accomplished in about one week to ten days or less, without interrupting the poultry growing cycle. Thus, the present invention provides the only known way in which poultry farmers can convert their poultry houses in a cost-effective manner. Accordingly, the present invention provides a more cost-effective method and apparatus for converting post-style poultry houses to clear span houses because the drinker and feeder equipment typically used in the houses does not need to be removed and replaced. All the known methods and apparatus require removing and later replacing the drinker and feeder equipment in order to accomplish the conversion.

Also, the present invention provides a more cost-effective conversion method because the use of lightweight prefabricated truss components allows for an expeditious structural modification which can be accomplished during the typical downtime between flocks of birds, thereby avoiding interruption of the flock-growing cycles. All the known prior art conversion methods require the house to miss at least one flock of production to accomplish the conversion.

Furthermore, the method of the present invention provides for accomplishing the structural conversion without removing, replacing, temporarily bracing, or otherwise disturbing any components of the roof structure while making the conversion. There is thereby realized a substantial savings in time and cost in carrying out the conversion.

It will be understood that the apparatus and method of the present invention can be suitably employed in any application where it is desirable to convert a post-style structure to a clear span-style structure, such as housing structures for other animals or for vegetation, sports and entertainment venues, and so forth. Also, the apparatus and method are suitable for use in conjunction with other sizes and shapes of poultry houses, with other spacings and numbers of posts, and with other roof structures and arrangements. Additionally, while the method of the invention is described herein as a conversion of a post-style structure to a clear span-style structure, the method can also be implemented in new construction applications where a clear span-style structure is desired (except that there is no post removal and the roof structure is generally installed and mounted to the trusses after the trusses are erected). Also, the method of the present invention can be implemented using various other similar truss apparatus and in various other sequences from those described herein. Furthermore, the terms "a" and "an" as used herein are not intended to mean only "one," but instead can mean any number more or less than one.

While the invention has been disclosed in several preferred forms, it will be apparent to those skilled in the art that many modifications, additions, and deletions can be made therein without departing from the spirit and scope of the invention as set forth in the following claims.

I claim:

1. A method for converting a post-style house to a clear span-style house, the house including side walls, a roof structure, drinker and feeder equipment suspended from the roof structure, and initially including upright posts within the house and supporting the roof structure, the roof structure including a roof top, inclined rafters supporting the roof top, roof beams extending transversely to and supporting the rafters, and joists each extending between and mounted to at least two of the beams, the method comprising the steps of:

(a) installing a series of prefabricated trusses for supporting the roof structure, the step of installing the series of trusses being carried out without removal of the roof structure or the drinker and feeder equipment and without the need for temporarily bracing the side walls or the roof structure, each of the trusses having a center section and two outer sections, the step of installing the trusses in turn comprising (i) attaching the center sections of the trusses to the roof structure, (ii) attaching upper ends of the outer sections to the center sections, and (iii) securing the lower ends of the outer sections in place; and (b) removing the upright posts from the house.

2. The method as claimed in claim 1 further comprising the step of raising the center and outer truss sections up to adjacent the roof structure manually or with only light equipment.

3. The method as claimed in claim 1 wherein the step of installing the trusses further comprises installing lateral braces to brace the truss sections.

4. A method for converting a post-style house to a clear span house, the house including side walls, a roof structure, drinker and feeder equipment suspended from the roof structure, end initially including upright posts supporting the roof structure, the roof structure including a roof top, inclined rafters supporting the roof top, roof beams extending transversely to and supporting the rafters, and joists each extending between and mounted to at least two of the beams, the method comprising the steps of:

(a) installing one or more prefabricated trusses for supporting the roof structure, the step of installing the trusses being carried out without removal of the roof structure or the drinker and feeder equipment and without the need far temporarily bracing the side walls or the roof structure; and (b) removing the upright posts from the house.

5. The method as claimed in claim 4 wherein each of the trusses comprises a plurality of truss sections, and wherein the step of installing the trusses comprises introducing the truss sections into the house, positioning at least a portion of the truss sections under and adjacent the roof structure, connecting the truss sections together to form assembled trusses, and securing the assembled trusses to the roof structure.

6. The method as claimed in claim 5 wherein one of the sections of each truss comprises a lateral truss member.

7. The method as claimed in claim 5 wherein the step of installing the trusses further comprises raising the truss sections up to adjacent the roof structure manually or with only light equipment.

8. The method as claimed in claim 7 wherein the step of installing the trusses comprises positioning a pivotal mounting foot of the lower portions of the trusses in place within the house, pivoting the trusses upwardly into position beneath and adjacent the roof structure, securing the trusses to the roof structure, and securing the pivotal mounting feet in place.

9. A clear span house that has been converted from a post-style house according to the method of claim 4.

* * * * *